United States Patent [19]

Callahan

[11] 4,105,094

[45] Aug. 8, 1978

[54] SINGLE LINE LUBRICANT REVERSING FEEDER

[75] Inventor: James J. Callahan, Mentor, Ohio

[73] Assignee: Houdaille Industries, Inc., Buffalo, N.Y.

[21] Appl. No.: 750,369

[22] Filed: Dec. 14, 1976

[51] Int. Cl.² ............................................. F16N 25/02
[52] U.S. Cl. .................................. 184/7 F; 184/7 E;
137/624.14
[58] Field of Search ................ 184/7 F, 7 E, 7 D, 12;
222/335; 137/624.14

[56] References Cited

U.S. PATENT DOCUMENTS

| | | | |
|---|---|---|---|
| 2,269,928 | 1/1942 | Dirkes | 184/7 E |
| 2,305,455 | 12/1942 | Nemetz | 184/7 D |
| 3,074,509 | 1/1963 | Robson | 184/7 E |
| 3,515,245 | 6/1970 | Obergefell et al. | 222/335 X |

FOREIGN PATENT DOCUMENTS

| | | | |
|---|---|---|---|
| 532,493 | 10/1956 | Canada | 184/7 E |
| 1,246,294 | 10/1960 | France | 184/7 F |
| 1,339,855 | 9/1963 | France | 184/7 F |

*Primary Examiner*—David H. Brown
*Attorney, Agent, or Firm*—Hill, Gross, Simpson, Van Santen, Steadman, Chiara & Simpson

[57] ABSTRACT

A single line lubricant reversing feeder for use in a centralized lubricating system, the feeder having a valving piston and a metering piston, by virtue of the movement of which a measured portion of the lubricant supplied to the feeder is delivered to a point of use such as a bearing, and the remaining portion is directed to the next succeeding feeder in the system. The feeder is arranged so that only a single check valve is required to accomplish the foregoing.

8 Claims, 4 Drawing Figures

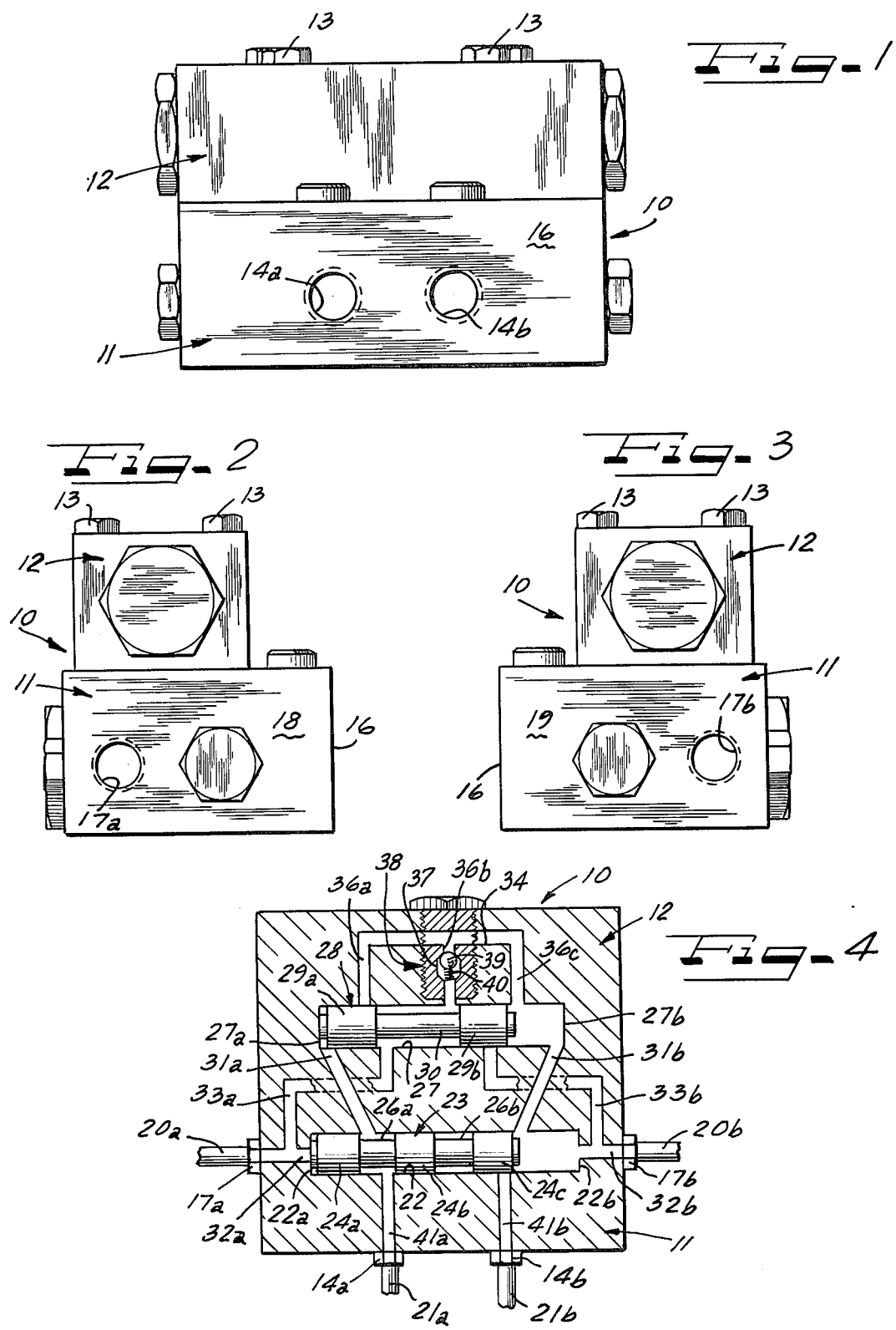

SINGLE LINE LUBRICANT REVERSING FEEDER

BACKGROUND OF THE INVENTION

The present invention relates generally to the field of lubrication, and more particularly to a reversing feeder used in centralized lubrication systems of the single line type.

Centralized lubrication systems are used in lubrication applications which require predetermined quantities of lubricant to be delivered to a plurality of points of use, such as bearings and the like. Typically such systems employ a positive displacement lubricant pump which supplies lubricant (generally oil or grease) from a lubricant reservoir, to one or more lubricant feeders, from which the lubricant is delivered to the various points of utilization of measured quantities.

Centralized lubrication systems are generally divided into single and dual line types. The present invention relates to a lubricant feeder adapted for use in a single line system. Such systems employ a plurality of feeders connected in series in the main lubricant supply line. The lubrication pump is arranged to pump lubricant through the line first in one direction, until the feeders have all operated in sequence to deliver a measured quantity of lubricant to their respective points of utilization, and then in an opposite direction, by virtue of which the feeders again operate to deliver a measured quantity of lubricant to each of the points of utilization.

The reversing feeder of the present invention is of a type which utilizes a valving piston and a metering piston. The valving piston shifts in response to the biasing force of pressurized lubricant, and in doing so performs a valving function whereby the pressurized lubricant is directed to one end of the metering piston. The metering piston then shifts or moves axially, forcing a measured quantity of lubricant through a feeder outlet to a point of utilization. After the metering piston has shifted completely from one limiting end position to another, the pressurized lubricant is directed through various passages back to the lubricant line in series and thence to the next or subsequent feeder connected in the line.

Reversing feeders of the type generally described are known in the prior art. See, for example, Obergefell et al. U.S. Pat. No. 3,515,245, assigned to the assignee of the present application. Generally, however, such reversing feeders require a pair of check valves in order to operate in the manner described above. The present invention has as a principal object the elimination of one of the check valves, and the advantages which logically derive from such elimination.

SUMMARY OF THE INVENTION

The present invention may be conveniently summarized as comprising a lubricant reversing feeder having a valving piston, a metering piston and a single check valve. Thus, as contrasted with previous single line reversing feeders, the present feeder is constructed and arranged to deliver a measured quantity of lubricant to its point or points of utilization, and thereafter to deliver lubricant to the next reversing feeder, in a manner whereby only a single check valve is required for each of the feeders.

It is therefore an object of the invention to reduce the manufacturing costs of the feeder by reducing the number of check valves required, to simplify the maintenance of the feeders, to reduce the number of moving parts and to increase the longevity or useful life of the feeders.

In accordance with the principles of the present invention, the feeders may involve a two-piece housing, with the valving piston being located in one housing piece and the metering piston being located in the other. Furthermore, the check valve may be of the cartridge type to improve the overall performance of the feeder.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

BRIEF DESCRIPTION OF THE DRAWINGS

FIGS. 1–3 are, respectively, front, left and right elevational views of a single line centralized lubrication reversing feeder constructed in accordance with the principles of the present invention.

FIG. 4 is a schematic sectional view of the reversing feeder shown in FIGS. 1–3.

DESCRIPTION OF THE PREFERRED EMBODIMENT

Referring to FIGS. 1–3, the lubricant reversing feeder of the present invention is indicated generally at reference numeral 10. Typically, the reversing feeder 10 may be employed in a centralized lubrication system of the single line type as shown, for example, in Obergefell et al U.S. Pat. No. 3,515,245, to which reference is made hereinabove.

The reversing feeder 10 comprises a lower housing part 11 and an upper housing part 12. A plurality of fastening devices such as the threaded bolts indicated at reference numerals 13 are employed to connect the housing parts 11 and 12 in assembled relation.

A pair of outlet ports $14_a$ and $14_b$ are formed in a front wall 16 of the lower housing part 11, and a pair of in-out ports $17_a$ and $17_b$ are formed respectively in side walls 18 and 19 of the lower housing part 11.

As will become apparent hereinafter, a valving piston is located in the lower housing part 11 and a metering piston is located in the upper housing part 12. While the reversing feeder 10 shown in FIGS. 1–3 employs two housing parts 11 and 12 which are fastened together to provide, in effect, a single housing, the principles of the present invention are equally applicable to reversing feeders which employ only a single housing member, in which the valving piston and the metering piston are both located.

The in-out ports $17_a$ and $17_b$ are adapted for connection to a single reversible main lubricant line by means of which a plurality of feeders corresponding to the reversing feeder 10 are connected in series. The lubricant line, in turn, is connected to a lubricant pump, preferably of the positive displacement type, which in turn is connected to a reservoir containing oil, grease or other suitable lubricant.

In a single line centralized lubrication system of the type in which the reversing feeder 10 is employed, the pump first directs pressurized lubricant in one direction through the main lubricant line until all of the feeders connected in series thereby have operated to discharge metered quantities of lubricant to their corresponding points of utilization, such as bearings or the like. The feeder 10 shown in FIGS. 1-3 discharges measured quantities of lubricant through the outlet ports $14_a$ and $14_b$ which are adapted for connection to suitable conduits which terminate at the lubrication points being serviced by the reversing feeder 10.

Referring to FIG. 4, a portion of the main lubricant line connected to the in-out ports $17_a$ is indicated at reference character $20_a$, whereas the portion of the main lubricant line connected to in-out port $17_b$ is shown at $20_b$. Reference characters $21_a$ and $21_b$ indicate respectively portions of conduits connected to outlet ports $14_a$ and $14_b$ for directing lubricant in measured quantities to corresponding points of utilization.

In FIG. 4 the lower portion of the reversing feeder 10 is indicated by means of reference numeral 11, and the upper portion by means of reference numeral 12. It will be appreciated, however, that the feeder shown schematically in FIG. 4 corresponds to the feeder 10 shown in FIGS. 1-3, and the feeder housing may be of one piece construction as shown in FIG. 4 or of the two piece construction shown in FIGS. 1-3.

Located within a valving piston chamber 22 is an axially slidable or shiftable valving piston indicated generally at reference numeral 23. The valving piston 23 is of the three-lobe type, the lobes being indicated respectively at reference characters $24_a$, $24_b$ and $24_c$. Lobes $24_a$ and $24_b$ are interconnected by a reduced diameter joiner rod $26_a$, whereas lobes $24_b$ and $24_c$ are interconnected by means of a joiner rod $26_b$.

Also formed in the feeder 10 is a metering piston chamber 27 within which is slidably carried a metering piston indicated generally at 28. The metering piston 28 is of the two-lobe type, one lobe of which is indicated at $29_a$ and the other of which is indicated at $29_b$. The lobes $29_a$ and $29_b$ are interconnected by means of a reduced diameter joiner rod 30.

Also formed within the feeder 10 are a plurality of lubricant passages arranged symmetrically as the feeder 10 is viewed in FIG. 4. For example, a pair of passages $31_a$ and $31_b$ respectively communicate opposite ends $27_a$ and $27_b$ of the metering piston chamber 27 with the valving piston chamber 22.

Another pair of passages $32_a$ and $32_b$ respectively communicate the in-out ports $17_a$ and $17_b$ with opposite ends $22_a$ and $22_b$ of the valving piston chamber 22.

Another pair of passages $33_a$ and $33_b$ respectively communicate passages $32_a$ and $32_b$ with the metering piston chamber 27 inwardly of the ends $27_a$ and $27_b$ thereof. Another passage 34 has extending therefrom passages $36_a$, $36_b$ and $36_c$, all three of which directly open to the metering piston chamber 27.

The passage $36_b$ is provided with an enlarged central portion 37 to accommodate a one-way check valve indicated generally at reference numeral 38, the check valve including a ball check 39 and a spring member 40. As is apparent from FIG. 4, the check valve 38 is arranged such that lubricant may flow downwardly, but not upwardly, through passage $36_b$.

In operation the lubricant lines indicated at reference characters $20_a$ and $20_b$ constitute only portions of a longer main lubricant line which interconnects, in series, a number of reversing feeders 10, with the ends of the main lubricant line being connected to a suitable lubricant pump.

The operation of the reversing feeder 10 may be described in the following manner. Assume that lubricant under pressure is being supplied through the line $20_a$ to the in-out port $17_a$, and that the valving piston 23 and the metering piston 28 are in the leftward positions thereof shown in FIG. 4.

The pressurized lubricant flows into the passage $32_a$ and, since it cannot flow through the passage $33_a$ by virtue of the one-way check valve 38 in the passage $36_b$, forces the metering piston 23 from the leftward limiting end position thereof shown in FIG. 4, to a rightward limiting end position.

After the valving piston 23 has moved to its rightward limiting end position, lubricant flow is established through the passage $31_a$, whereby the metering piston 28 is moved from the leftward limiting position thereof shown in FIG. 4 to its rightward limiting end position.

As the metering piston 28 moves rightwardly, lubricant within the end $27_b$ of the metering piston chamber 27 is forced through the passage $31_b$ and the valving piston chamber 22 between piston lobes $24_b$ and $24_c$, through a passage $41_b$ which communicates with the lubricant outlet $14_b$. The lubricant is then directed through the conduit $21_b$ to a corresponding bearing or similar lubrication point.

It will be appreciated that the quantity of lubricant delivered through the conduit $21_b$ corresponds to the diameter and displacement of the metering piston 28. As a consequence, the quantity of lubricant delivered per movement of the metering piston 28 can be varied by varying the diameter and length of movement of the metering piston 28.

After the metering piston 28 has shifted to its rightward limiting end position, the pressurized lubricant flowing through the passage $31_a$ enters the passage $36_a$ and flows through the passage 36 past the check valve 38, and thence through the metering piston chamber 27 between the lobes $29_a$ and $29_b$, to the passage $33_b$, from which it flows through the in-out port $17_b$ to the continuation of the main lubricant line $20_b$. It will be appreciated that the line $20_b$ is connected at its opposite end either to an in-out port of the next succeeding reversing feeder 10, or to the lubricant pump which delivers the pressurized lubricant.

After the reversing feeder 10, as well as the remaining feeders to which it is connected in series, have discharged their measured quantities of lubricant to corresponding points of use, the direction of the flow of lubricant from the pump is reversed through the main lubricant line.

Thus, the pressurized lubricant is delivered through the line $20_b$, rather than line $20_a$. When that occurs, of course, the valving piston 23 and the metering piston 28 are both situated at their rightward limiting end positions.

The sequence of operation of the pistons 23 and 28 is similar, however, regardless of whether the pressurized lubricant is entering the feeder 10 through the line $20_a$ or the line $20_b$. For example, when the pressurized lubricant is being supplied through line $20_b$, the valving piston 23 is moved leftwardly to the position thereof shown in FIG. 4, whereupon the pressurized lubricant flows through passage $31_b$ into the end $27_b$ of the metering piston chamber 27. The metering piston 28 is thereby moved to its leftward limiting end position, forcing a measured quantity of lubricant through passage $31_a$, then through the valving piston chamber 22 between the lobes $24_a$ and $24_b$ of the valving piston 23, and then through a passage $41_a$ to the lubricant outlet $14_a$, from which the lubricant is delivered through conduit $21_a$ to its corresponding point of utilization.

After the metering piston 28 has moved leftwardly to its limiting end position, the pressurized lubricant flowing through the passage 31$_b$ flows through the passage 36$_c$ and down through the passage 36$_b$, through the check valve 38, and thence through the passage 33$_a$ to the in-out port 17$_a$, from which it flows through the main lubricant line 20$_a$ to the next succeeding feeder 10 or to the lubricant pump.

It will be appreciated that by virtue of the novel arrangement of the valving piston, the metering piston and the series of lubricant passages within the feeder 10, the reversing feature of the feeder 10 is accomplished by means of only a single check valve 38. In terms of its principal function, however, the reversing feeder of the present invention operates in the manner of previously known reversing valves which require two check valves as, for example, the feeder disclosed in the previously mentioned Obergefell et al. U.S. Pat. No. 3,515,245.

Although minor modifications might be suggested by those versed in the art, it should be understood that I wish to embody within the scope of the patent warranted hereon all such modifications as reasonably come within the scope of my contribution to the art.

What I claim is:

1. A single line lubricant reversing feeder for metering a measured quantity of lubricant from a reversible single lubricant supply line comprising means forming a feeder housing, means in said feeder housing forming a pair of in-out ports, a pair of outlet ports, a valving piston chamber having a valving piston movable therein between first and second limiting end positions, a metering piston chamber having a metering piston movable therein between first and second limiting end positions, and passage means communicating said in-out ports, said outlet ports, said valving piston chamber and said metering piston chamber, said passage means being constructed and arranged to effect movement of said metering piston to one of its limiting end positions upon movement of said valving piston to a corresponding one of its limiting end positions, and check valve means comprising a single check valve located in said passage means for establishing flow between said pair of in-out ports only when said valving piston and said metering piston are disposed at corresponding limiting end positions.

2. A single line lubricant reversing feeder for metering a measured quantity of lubricant from a reversible single lubricant supply line comprising a feeder housing having means forming therein a pair of in-out ports and a pair of corresponding outlet ports, and flow means in said housing including piston means movable between first and second limiting end positions and a single check valve through which is conducted all of the lubricant which flows between said in-out ports in both limiting end positions of said piston means.

3. A single line lubricant reversing feeder for metering a measured quantity of lubricant from a reversible single lubricant supply line comprising a feeder housing, means in said housing forming first and second in-out ports and first and second outlet ports, means in said housing forming a valving piston chamber, valving piston means movable in said valving piston chamber between first and second limiting end positions, means in said housing forming a metering piston chamber, metering piston means movable in said metering piston chamber between first and second limiting end positions, means in said housing forming first and second passage means alternately connecting said in-out ports with first and second ends of said metering piston chamber when said first and second limiting end positions of said valving piston means respectively obtain, said metering piston means moving only after one of said limiting end positions of said valving piston means obtains to deliver a metered quantity of lubricant to a corresponding one of said outlet ports, means forming passage means in said housing communicating said first and second in-out ports and said metering piston chamber, and a single one-way check valve means in said passage means for establishing flow between said first and second in-out ports through said metering piston chamber only when said valving piston means and said metering piston means are disposed at limiting end positions thereof.

4. The invention as defined in claim 3 wherein said valving piston means comprises a 3-lobe piston.

5. The invention as defined in claim 3 wherein said one-way check valve means comprises a cartridge type check valve.

6. The invention as defined in claim 3 wherein said feeder housing comprises first and second separable housing parts and removable fastening means for connecting said housing parts in assembled relation, said valving piston means and said metering piston means being disposed within different ones of said housing parts.

7. The invention as defined in claim 3 wherein said metering piston means comprises a 2-lobe piston.

8. The invention as defined in claim 7 wherein said passage means comprises a one-way flow passage in constant communication with said metering piston chamber between said lobes of said metering piston, said check valve means being disposed within said one-way flow passage.

* * * * *